United States Patent [19]

Hamane et al.

[11] 4,412,564
[45] Nov. 1, 1983

[54] APPARATUS FOR FORMING AN INTERPOLE CROSSOVER WIRE BETWEEN STATOR COILS

[75] Inventors: Tokuhito Hamane, Hirakata; Toshio Kinoshita, Katano; Masafumi Kihira, Hyogo, all of Japan

[73] Assignee: Matsushita Electric Industrial Co., Ltd., Kadoma, Japan

[21] Appl. No.: 237,404

[22] Filed: Feb. 23, 1981

[51] Int. Cl.³ .............................................. B21F 3/00
[52] U.S. Cl. ................................................. 140/92.1
[58] Field of Search ................. 140/92.1; 242/7.05 B, 242/7.14

[56] References Cited

U.S. PATENT DOCUMENTS 3,828,830  8/1974  Hill et al. ............................... 140/1
3,872,897  3/1975  Droll et al. ........................ 140/92.1
3,967,658  7/1976  Arnold ............................... 140/92.1

FOREIGN PATENT DOCUMENTS 55-26075  2/1980  Japan ..................................... 29/596

Primary Examiner—Lowell A. Larson
Assistant Examiner—Jonathan L. Scherer
Attorney, Agent, or Firm—Wenderoth, Lind & Ponack

[57] ABSTRACT

An apparatus for forming an interpole crossover wire in a winding apparatus for winding a wire around a spool to form stator coils. The circular arc motion of a pair of pawls is performed by a piston-cylinder device driving an adjustable link mechanism. By adjusting the dimensions of the link mechanism the length of the circular arc motion of the pawls can be adjusted.

3 Claims, 8 Drawing Figures

Fig. 7 (B)    PRIOR ART

APPARATUS FOR FORMING AN INTERPOLE CROSSOVER WIRE BETWEEN STATOR COILS

BACKGROUND OF THE INVENTION

The present invention relates to an apparatus for forming an interpole crossover wire extending between adjacent stator coils, which is used in a winding apparatus for winding an electric wire or the like around a spool such as a stator or the like to produce a set of coils each connected with the adjacent coils by the interpole crossover wire, the respective coils being wound in opposite directions from the next adjacent coil in the set.

Conventionally, various winding machines for winding a wire to form a coil are generally associated with an apparatus for forming the stator interpole crossover wire, for example, such a one as shown in FIG. 1.

Referring to FIG. 1, winding apparatus has a flyer 1 which rotates around a spool 2 and a nozzle 3 slidably mounted on the flyer 1 guides an electric wire 4 from the flyer 1 onto the spool 2 as disclosed in U.S. Pat. No. 3,872,897 patented on Mar. 25, 1975. The processing apparatus has a moving pawl 5 secured to a shaft 6, and a stationary pawl 7 slidably supports the shaft 6. Scraping rods 8 are guided for vertical motion in the grooves 2a of the spool 2.

Prior to the winding operation, the end of the wire 4 is retained by clamp means (not shown) on the flyer in a known manner. The wire 4 is wound around the spool 2 by the rotation of the flyer 1 in the direction of the arrow A to produce a coil, and then the coil is removed from the spool 2 by lowering the rods 8, as disclosed in U.S. Pat. No. 3,828,830 patented on Aug. 13, 1974. In this condition, the wire 4 extends from the end of the coil 9 to the nozzle 3. To wind the next coil 9, the wire 4 is required to be retained at the end of a coil 9 which has just been wound on the spool 2. To do this, the stationary pawl 7 and the moving pawl 5 are advanced in the forward direction by a piston-cylinder device (not shown) for longitudinal motion and thereafter are raised by a piston-cylinder device (not shown) for vertical motion. At this time, the wire 4 is grasped between the stationary pawl 7 and the moving pawl 5, and is held between the moving pawl 5 and the stationary pawl 7. Thereafter the stationary pawl 7 and the moving pawl 5 are moved rearwardly and the wire 4 is drawn out from the nozzle 3. The stationary pawl 7 and the moving pawl 5 are then moved to the left by a piston-cylinder for sideways motion (not shown) and come to stop at the position shown in FIG. 7(B). After the coil 9 has been completely removed from the spool 2 by the descending of the scraping rods 8, the flyer 1 begins to rotate in the direction opposite to that of the arrow A to wind the electric wire around the spool 2. After the wire 4 is wound several times around the spool 2, the stationary pawl 7 and the moving pawl 5 are lowered by the vertical motion piston-cylinder (not shown). Thereafter, the moving pawl 5 separates from the stationary pawl 7 to release the wire. The stationary pawl 7 and the moving pawl 5 are then moved to right by the sideways movement piston-cylinder (not shown) and are returned to their initial positions.

The conventional apparatus having the above construction has the following defects.

(1) Since three operations such as advancing, retreating and moving-to-left operations of the stationary pawl and the moving pawl are performed by piston-cylinder devices prior to the winding of the next coil, time required for the operation cannot be easily shortened.

(2) If the piston-cylinder device for the longitudinal movement of the fixed pawl and the stationary pawl fail, the fixed pawl and the moving pawl may move to left without retreating, thus contacting and possibly damaging the spool.

SUMMARY OF THE INVENTION

An object of the present invention is to provide an apparatus for forming the interpole crossover wire between coils wound in a winding apparatus for winding a wire or the like around a spool such as a stator or the like having the characteristics as described hereinabove, which can eliminate the disadvantages inherent in the conventional forming apparatus, and which is simple, light in weight, positive in operation and which will not malfunction. Another object of the present invention is to provide an apparatus for forming the interpole wire between coils wound in a winding apparatus for winding a wire or the like around a spool such as a stator or the like, wherein circular arc motion of a pair of pawls is performed by a single piston-cylinder device and the stroke of the circular arc motion of the pair of pawls is amplified at a lever ratio. Thus, the stroke of the piston-cylinder device can be kept small or the speed can be made slow, with the result that the service life of the piston-cylinder device can be extended and processing operation speeded up. Since the circular arc motion of the pair of pawls can be produced by one piston-cylinder device, the controlling operation is simplified and the apparatus can be made smaller in size than the conventional apparatus.

According to the present invention, there is provided an apparatus for forming a stator interpole crossover wire, wherein a pair of interpole wire retaining pawls are provided to engage the trailing end of a coil wound around a spool, driving means is provided for opening or closing said pair of pawls, a link mechanism which can be adjusted to change the length of a circular arc reciprocating motion of the pair of pawls to form the interpole crossover wire, and a piston-cylinder device to operate said link mechanism.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
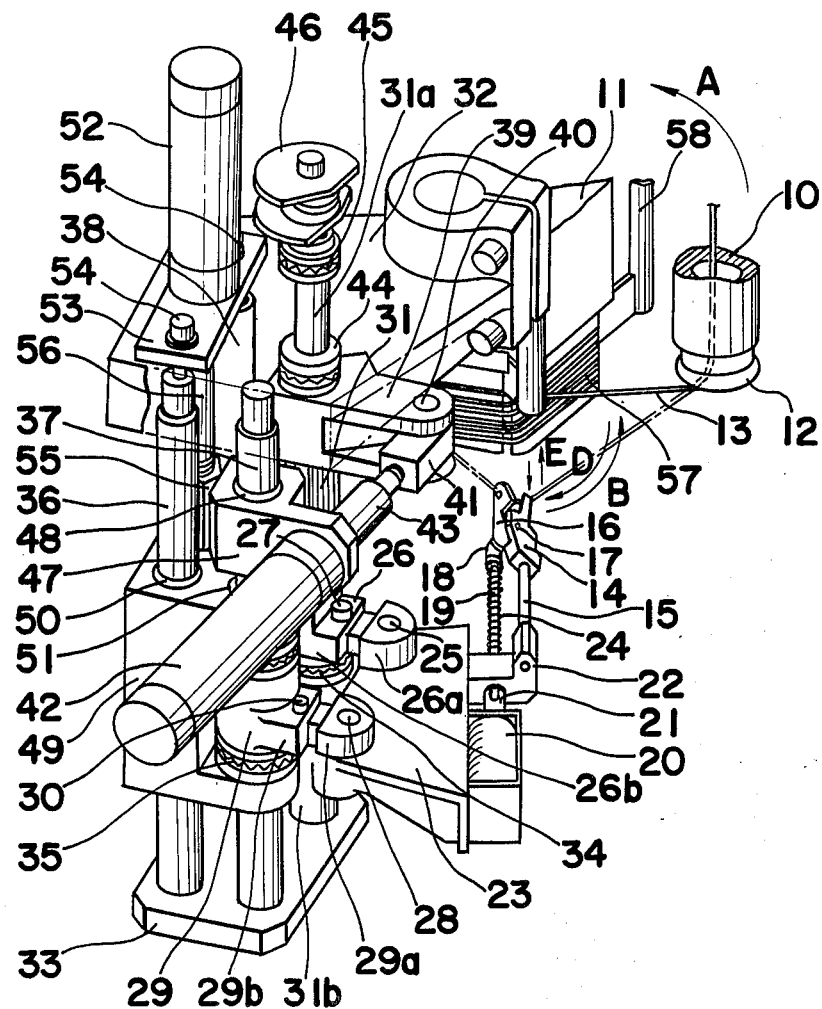
FIG. 2 is a perspective view of an apparatus for forming the interpole crossover wire according to one embodiment of the present invention and a portion of the winding apparatus with which it is used.
Figure 3:
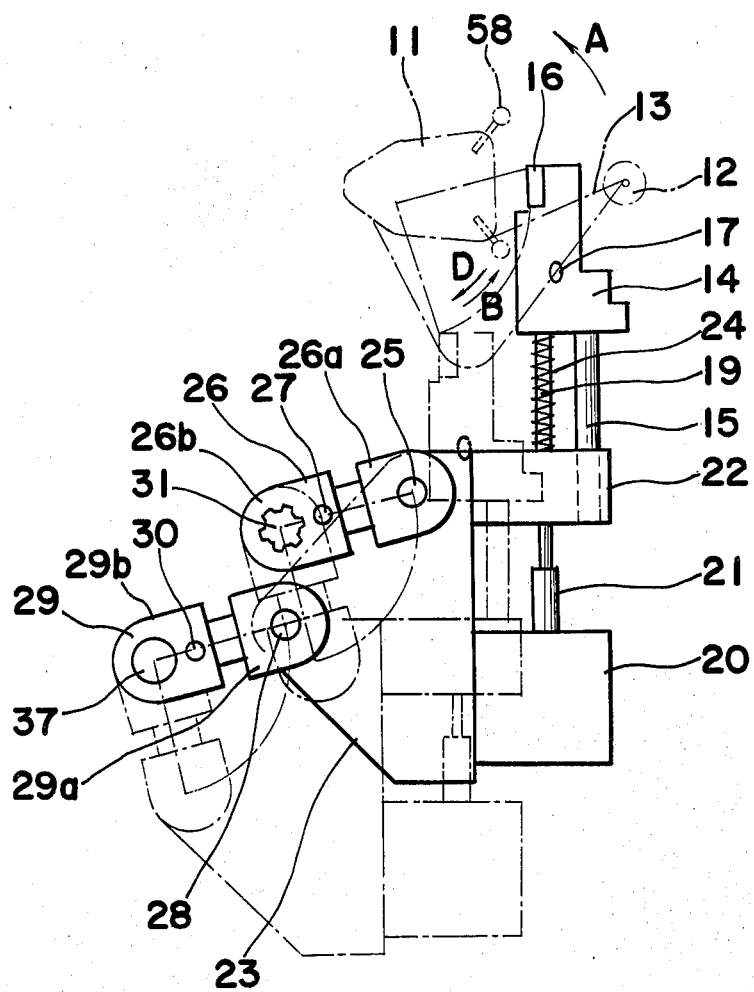
FIG. 3 is a schematic plan view for illustrating the operation of the apparatus of FIG. 2, in a case where a long link is provided in the apparatus.
Figure 4:
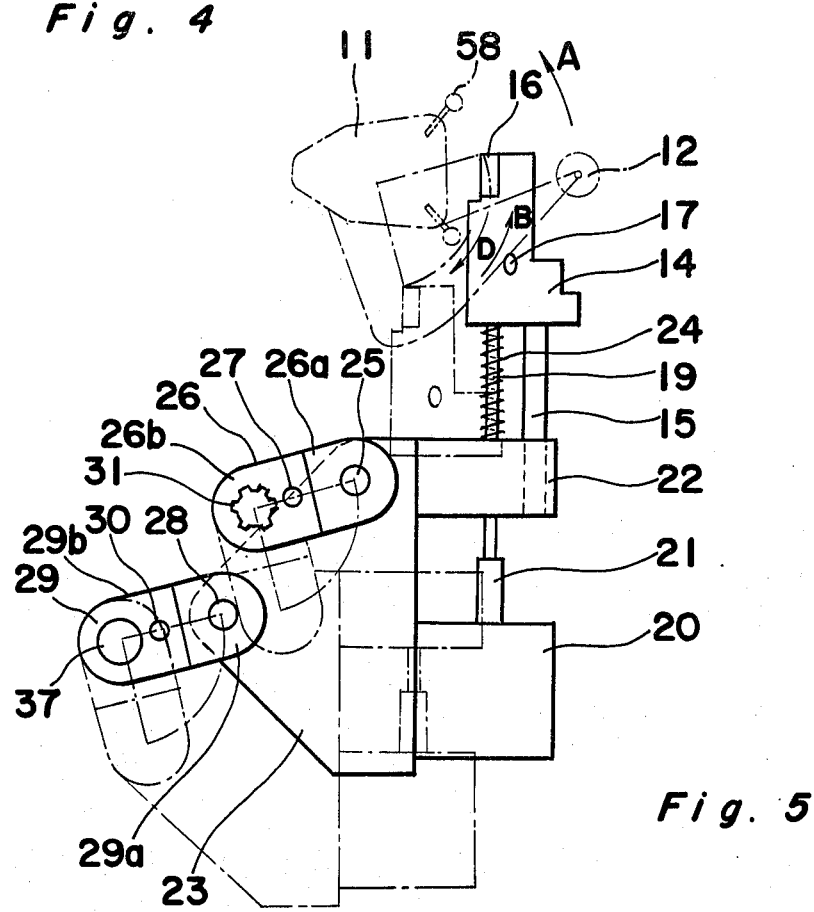
FIG. 4 is a view like FIG. 3 but illustrating the operation of the apparatus of FIG. 2 in a case where a short link is provided in the apparatus.
Figure 5:
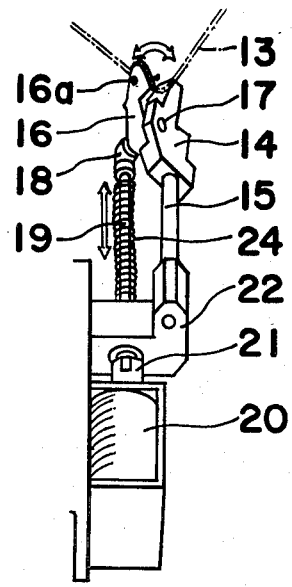
FIG. 5 is a perspective view, on a slightly enlarged scale, of the means for opening and closing of the pawls of the apparatus of FIG. 2.
Figure 6:
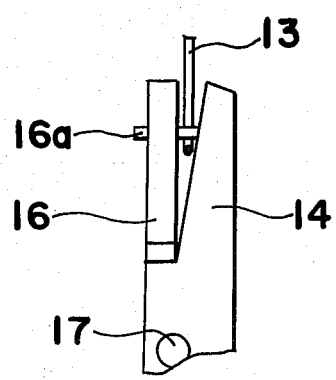
FIG. 6 is a side view, on an enlarged scale, of the pawls of the apparatus of FIG. 2.

Referring to FIG. 2 showing the apparatus of the present invention, a flyer 10 of the winding apparatus is adapted to rotate around a spool 11 and has a nozzle 12 guiding an electric wire 13 from a wire supply (not shown) therethrough and toward the spool in the known manner. A stationary pawl 14 is secured to a shaft 15 on the forming apparatus and a movable pawl 16 is rotatably mounted on a pin 17 on the stationary pawl 14 and has a guide bar 16a thereon for engaging the wire 13 with the pawls when the moving pawl is pivoted to the closed position, as shown in FIGS. 5 and 6. A tie rod 19 has one end 18 coupled to one end of the movable pawl 16 for moving the movable pawl 16 in reciprocal oscillation on the pin 17 by the action of the rod 21 of a solenoid 20 and which is coupled to the other end of rod 19. An arm 22 is secured to a bracket 23 and supports a shaft 15 on which stationary pawl 14 is mounted. Bracket 23 has a hole through which the tie rod 19 is freely movable. The solenoid 20 is mounted on a bracket 23. A compression spring 24 around tie rod 19 urges the movable pawl 16 away from the stationary pawl 14 in the opening direction. The bracket 23 is rotatably supported on a lift body 49 by a pair of links 26 and 29. A pair of pins 25 and 28 secure the links 26 and 29 to the bracket 23. The links 26 and 29 each having a first portion 26a and 29a slidably engaged with a second portion for adjusting the length of the links 26 and 29. Bolts 27 and 30 fix the slidable portions 26a and 29a to the fixed portions 26b and 29b after they have been set in the proper positions. The links 26 and 29 thus form, with bracket 23, a parallel crank mechanism for moving the bracket 23 between respective rearward and forward positions of the pawls by rotation of the links 26 and 29, as shown in FIGS. 3 and 4. The portions 26b and 29b are respectively engaged with shafts 31 and 37. The splined shaft 31 is engaged with the spline grooves provided in the portion 26b of the link 26. The upper portion 31a of the shaft 31 is rotatably supported on an upper plate 32, and the lower portion 31b of the shaft 31 is rotatably supported on a lower plate 33. Thrust bearings 34 and 35 are provided between the lift body 49 and the portions 26b and 29b to receive the thrust loads of links 26 and 29. A set of slide shafts 36 and 38 and shaft 37 have step shaft portions at the upper ends secured to the upper plate 32 and at their bottom ends to the lower plate 33 to fix the plates 32 and 33 to each other at a fixed spacing. A lever 39 has one end fixedly secured to the spline shaft 31 and has the other end pivotally connected to one end of a connector 41 by a pin 40. The connector 41 is secured at its other end to the rod 43 of a piston-cylinder device 42 by a threaded connection, and the lever 39 is adapted to rotate the splined shaft 31 around its longitudinal axis upon movement of rod 43 in and out of piston-cylinder device 42. A thrust bearing 44 is provided between the lever 39 and the upper plate 32 to support the upward thrust load of the splined shaft 31. A thrust bearing 45 is also provided against the upper plate 32 to support the downward thrust load to the spline shaft 31. A plate cam 46 is mounted on shaft 31 which rotates in synchronous relation with the oscillation of the lever 39 to make it possible to detect the position of the lever 39 by contact of the cam with a limit switch (not shown). A link 47 is rotatably mounted on shaft 37 by a bushing 48 and has the piston-cylinder device 42 on the other end thereof. The lift body 49 is slidably supported on the shafts 36, 37 and 38 and the splined shaft 31. Bearings 50 and 51 are provided on the lift body 49 and the slide shafts 36 and 37 are vertically guided therein. A flange 53 on a piston-cylinder device 52 from which a rod 56 extends, is secured, at the ends, to the slide shafts 36 and 38 with bolts 54. A connector 55 is coupled at its one end to the rod 56 of the piston-cylinder device 52 and at its other end to the lift body 49, whereby the lift body is raised and lowered by the operation of the piston-cylinder device 52.

The operation of the above-described embodiment will be described hereinafter.

The wire 13 extending from the nozzle 12 of the flyer 10 is wound around the spool 11 to form a first coil 57 by rotation in the direction of arrow A flyer 10 in the same manner as in the conventional winding apparatus. At the end of this operation, the wire 13 extends between the end of the coil 57 and the nozzle 12 of the flyer 10. The rod 43 is then advanced by operation of piston-cylinder device 42, and the lever 39 is rotated to rotate the link 26 through the splined shaft 31, thereby to move the stationary pawl 14 and the movable pawl 16 in a circular arc in the direction of arrow B from the rearward to the forward position, i.e. from the position of FIG. 3 to the position of FIG. 4. The movable pawl 16 is pivoted away from the stationary pawl 14, and the pawls are moved in a direction for engaging the wire 13 in the gap between the pawls, as shown in FIG. 6. Upon energization of the solenoid 20, the rod 21 is retracted. The tie rod 19 is retracted against the force of the compression spring 24 to pivot the movable pawl 16 until the guide bar 16a engages the stationary pawl 14 so as to engage the wire 13, as shown in FIG. 6.

Then the rod 43 of the piston-cylinder device 42 is retracted to rotate the lever 39 in the opposite direction, i.e. the direction of arrow D, thereby to rotate the links 26 and 29 in the opposite direction. The stationary pawl 14 and the movable pawl 16 are moved along the circular arc to carry the wire 13 in the direction of arrow D, the wire 13 being drawn out from the nozzle 12 of the flyer 10 to the stationary pawl 14 to form the interpole crossover wire. Thereafter the piston-cylinder device 52 is operated to raise the lift body 49 and thus raise the stationary pawl 14 and the movable pawl 16 in a vertical-linear motion in the direction of an arrow E. Thereafter, the coil 57 is removed from the spool 11 by the action scraping rod 58 moving downwardly, whereby the spool is ready for the next winding operation to be performed.

Then, the flyer 10 is rotated in the direction opposite to that of arrow A to wind the wire 13 around the spool 11 several times in the opposite direction to that in the removed coil 57. Then the piston-cylinder device 52 is operated to lower the lift body 49 and with it the stationary pawl 14 and the movable pawl 16. The solenoid 20 is then de-energized to open the movable pawl 16 to release the wire 13. At this time all the parts are in the initial positions.

Figure 1:
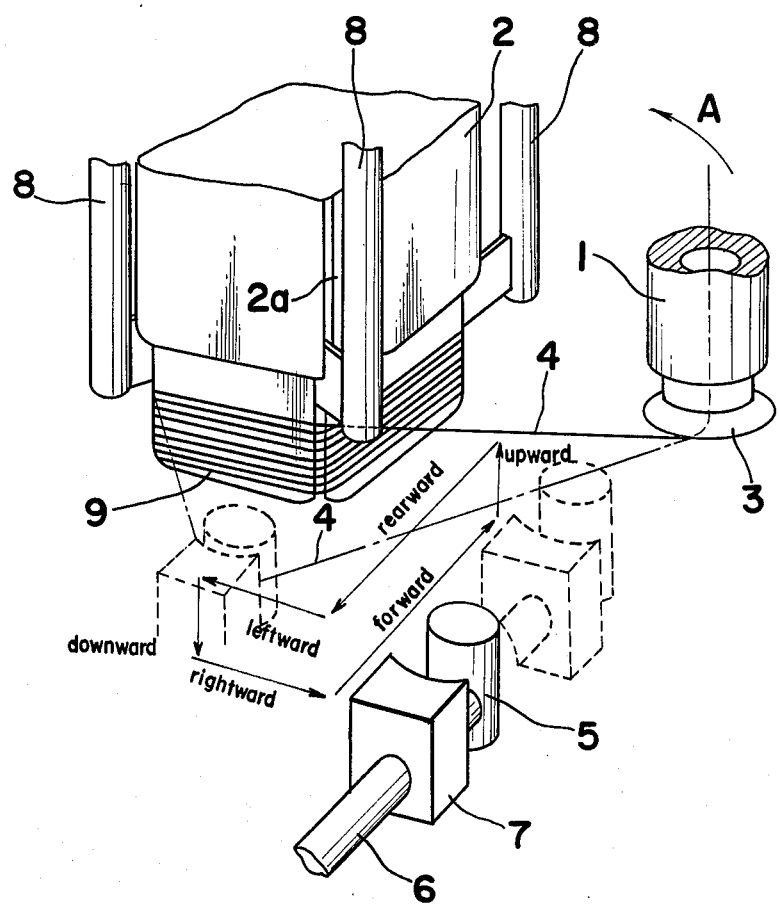
FIG. 1 is a schematic perspective view of a portion of a conventional apparatus for forming the interpole crossover wire between adjacent stator coils being wound on a coil winding apparatus.
Figure 7:
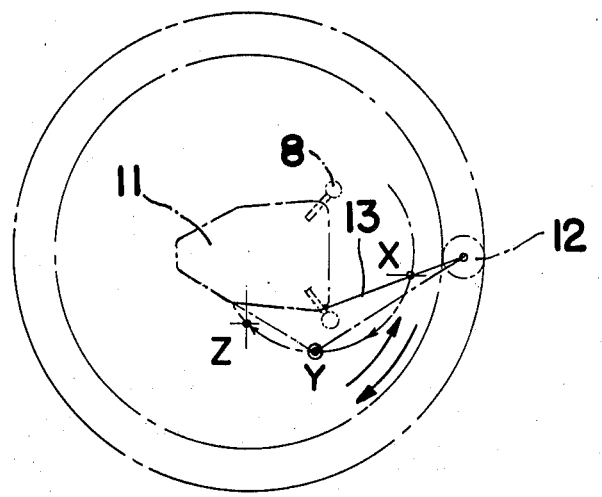
FIGS. 7(a) and 7(b) are schematic plan views for comparing the operation of the conventional apparatus of FIG. 1 and the apparatus of the present invention as shown in FIG. 2.
Figure 7:
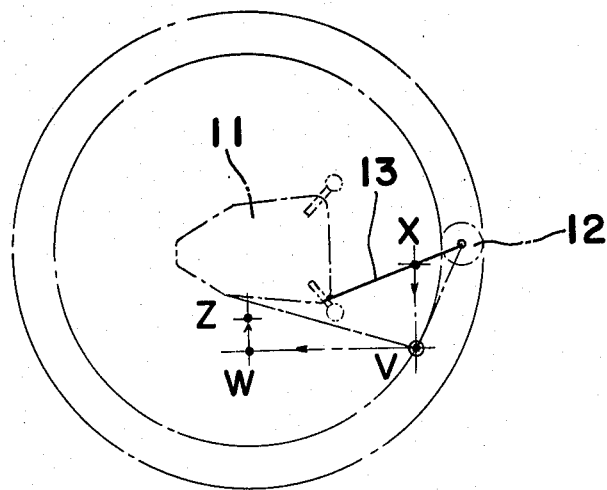

According to the present invention, the first or movable portion 26a of the link 26 can be moved toward the second or fixed portion 26b thereof and the portion 29a of the link 29 moved toward the portion 29b thereof as shown in FIG. 4 to shorten the respective lengths of the links 26 and 29 to shorten the length of the circular arc movement. For instance, the pawls can be moved along with clamping the wire in the circular arc from a point X through point Y to a point Z at which the length of the interpole crossover wire is the longest, as shown in FIG. 7(A), in the apparatus of the present invention. In the conventional apparatus of FIG. 1, the longest length of the interpole crossover wire is when the clamp is at a point W of a clamp movement, which is a rectangular linear motion from the point X to the point Z through points V and W, as shown in FIG. 7(B). It is to be clearly noted that the length of the movement in the present invention is smaller than that in the conventional apparatus. Thus, the circular arc motions of the stationary pawl 14 and the movable pawl 16 are less than in the conventional apparatus. Also, the respective lengths of the links 26 and 29 can be changed to select the desired extent of the circular arc motion of the stationary pawl 14 and the movable pawl 16.

In the present apparatus for forming the stator interpole crossover wire, the circular arc motion of the pair of pawls is performed by one piston-cylinder device and the length of the circular arc motion is amplified by lever. Thus, the stroke of the piston can be made smaller than in the conventional apparatus or the speed of the piston can be made slower, with the result that the service life can be extended and the tact up can be provided. Also, since the circular arc motion of the pair of pawls can be performed by one cylinder, the control operation is simplified and the apparatus can be made smaller in size than the conventional apparatus.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. An apparatus for forming an interpole crossover wire between a succession of continuous stator coils each wound around the spool of a winding apparatus with successive coils being wound in opposite directions, said forming apparatus comprising:
   a pair of wire engaging pawls relatively movable toward and away from each other to engage and release a wire;
   pawl driving means connected to said pawls for relatively moving said pawls;
   a link mechanism on which said pawls are mounted for movement in a circular arc between a position adjacent the spool where said pawls are positioned to engage a wire extending between the coil being wound and the means for winding the wire and a position spaced away from the spool, the movement in the circular arc drawing wire out to form the interpole crossover wire, said link mechanism including means for adjusting the dimensions thereof for changing the arc along which the pawls are moved during movement of the link mechanism; and
   link mechanism drive means connected to said link mechanism for driving said link mechanism.

2. An apparatus as claimed in claim 1 in which said pawls comprise a stationary pawl and a movable pawl pivotally movably mounted for movement toward and away from said stationary pawl, and said pawl driving means comprises a solenoid having a movable member connected to said movable pawl for driving said movable member toward said stationary member when said solenoid is energized, and spring means engaged with said movable member for urging said movable member away from said stationary member.

3. An apparatus as claimed in claim 1 wherein said link mechanism includes a pair of links each having one portion movable toward and away from the other portion for adjusting the length of said links.

* * * * *